United States Patent
Persiantsev et al.

(10) Patent No.: US 11,044,404 B1
(45) Date of Patent: Jun. 22, 2021

(54) HIGH-PRECISION DETECTION OF HOMOGENEOUS OBJECT ACTIVITY IN A SEQUENCE OF IMAGES

(71) Applicant: Vulcan Inc., Seattle, WA (US)

(72) Inventors: Michael Persiantsev, Shrewsbury, MA (US); Cecil Lee Quartey, Seattle, WA (US); Samuel Allan McKennoch, Seattle, WA (US); Paul Benjamin Albee, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 100 days.

(21) Appl. No.: 16/203,432

(22) Filed: Nov. 28, 2018

(51) Int. Cl.
*H04N 5/232* (2006.01)
*G01B 11/26* (2006.01)

(52) U.S. Cl.
CPC ......... *H04N 5/23267* (2013.01); *G01B 11/26* (2013.01); *H04N 5/232* (2013.01)

(58) Field of Classification Search
USPC .............. 358/1.1–3.29, 1.11–1.18, 500–540; 382/103–108, 122, 123, 154–181, 382/214–228, 254–312; 715/238–255, 715/271–277
See application file for complete search history.

(56) References Cited

U.S. PATENT DOCUMENTS

| | | |
|---|---|---|
| 6,303,920 B1 | 10/2001 | Wixson |
| 6,424,370 B1 | 7/2002 | Courtney |
| 6,681,058 B1 | 1/2004 | Hanna et al. |
| 7,742,077 B2 * | 6/2010 | Sablak ............... H04N 5/23254 348/208.99 |
| 8,103,116 B1 | 1/2012 | Simonson et al. |
| 8,175,147 B1 | 5/2012 | Webb et al. |
| 8,284,266 B2 | 10/2012 | Deng |
| 8,335,345 B2 | 12/2012 | White et al. |
| 8,339,456 B2 * | 12/2012 | Eledath .................. G06K 9/209 348/154 |
| 8,896,713 B2 | 11/2014 | Corey et al. |
| 9,020,261 B2 | 4/2015 | Lipton et al. |
| 9,068,831 B2 | 6/2015 | Monobe et al. |
| 9,378,632 B2 | 6/2016 | Venetianer et al. |
| 9,413,963 B2 | 8/2016 | Beysserie et al. |

(Continued)

OTHER PUBLICATIONS

Mirhassani et al., "Motion based Unsharp Masking [MUSM] for Extracting Building from Urban Images," 2008 IEEE International Conference on Systems, Man and Cybernetics, Oct. 12, 2008, pp. 1280-1284.

(Continued)

*Primary Examiner* — Marcellus J Augustin
(74) *Attorney, Agent, or Firm* — Davis Wright Tremaine LLP

(57) ABSTRACT

A first image is aligned with a second image. A first motion value is computed based at least in part on a sum of differences between corresponding pixels in the first image and the second image. A second motion value is computed further based at least in part on a third image. An impact score is generated based at least in part on a difference between values derived from the first motion value and the second motion value and an action is performed depending at least in part on whether the impact score indicates that damage has occurred among objects represented in the first image and the second image.

20 Claims, 8 Drawing Sheets

(56) References Cited

U.S. PATENT DOCUMENTS

| | | |
|---|---|---|
| 9,554,046 B2 | 1/2017 | Ardo et al. |
| 9,697,587 B2 | 7/2017 | Yuan et al. |
| 9,721,172 B2 | 8/2017 | Wright et al. |
| 9,892,606 B2 | 2/2018 | Venetianer et al. |
| 9,904,853 B2 | 2/2018 | Hsu et al. |
| 10,024,965 B2 | 7/2018 | Nehmadi et al. |
| 10,594,940 B1 * | 3/2020 | Persiantsev ............ G01B 11/26 |
| 10,685,488 B1 | 6/2020 | Kumar |
| 2002/0141640 A1 | 10/2002 | Kraft |
| 2003/0053689 A1 | 3/2003 | Watanabe et al. |
| 2003/0108250 A1 | 6/2003 | Luo et al. |
| 2004/0181747 A1 | 9/2004 | Hull et al. |
| 2006/0132487 A1 | 6/2006 | Sada et al. |
| 2008/0170124 A1 | 7/2008 | Hatanaka et al. |
| 2009/0219401 A1 | 9/2009 | Drouot |
| 2011/0090344 A1 | 4/2011 | Gefen et al. |
| 2011/0249029 A1 | 10/2011 | Baumgart |
| 2012/0002112 A1 | 1/2012 | Huang et al. |
| 2012/0020524 A1 | 1/2012 | Ishikawa |
| 2012/0275511 A1 | 11/2012 | Shemer et al. |
| 2014/0188010 A1 * | 7/2014 | Paris ..................... A61B 5/682 |
| | | 600/595 |
| 2015/0103145 A1 | 4/2015 | Sakata |
| 2016/0027325 A1 * | 1/2016 | Malhotra ........... A63B 24/0021 |
| | | 434/252 |
| 2016/0140695 A1 | 5/2016 | Yuan et al. |
| 2016/0217348 A1 * | 7/2016 | Cho .................. G06K 9/00751 |
| 2016/0292905 A1 | 10/2016 | Nehmadi et al. |
| 2016/0360148 A1 | 12/2016 | Mahapatro et al. |
| 2017/0084045 A1 | 3/2017 | Hsu et al. |
| 2017/0161882 A1 | 6/2017 | Mantiuk et al. |
| 2017/0272842 A1 * | 9/2017 | Touma ................... A63B 43/00 |
| 2017/0278219 A1 | 9/2017 | Yuan et al. |
| 2018/0041716 A1 | 2/2018 | Kajimura et al. |
| 2018/0098083 A1 | 4/2018 | Mcallister |
| 2019/0089923 A1 | 3/2019 | Katano et al. |

OTHER PUBLICATIONS

Na Li et al., "Real-Time Video Object Segmentation Using HSV Space," Proceedings of IEEE International Conference on Image Processing, Sep. 22, 2002, 4 pages.

* cited by examiner

HIGH-PRECISION DETECTION OF HOMOGENEOUS OBJECT ACTIVITY IN A SEQUENCE OF IMAGES

CROSS REFERENCE TO RELATED APPLICATION

This application incorporates by reference for all purposes the full disclosure of co-pending U.S. patent application Ser. No. 16/203,457, filed concurrently herewith, entitled "SPECTRAL SELECTION AND TRANSFORMATION OF IMAGE FRAMES" and U.S. Pat. No. 10,594,940, entitled "REDUCTION OF TEMPORAL AND SPATIAL JITTER IN HIGH-PRECISION MOTION QUANTIFICATION SYSTEMS".

BACKGROUND

In order to analyze the movement of objects of interest captured in a sequence of image frames of a video recording, image frames corresponding to activity of interest must be separated from image frames that do not contain any activity of interest. However, identification of the images containing activity of interest from the sequence of images is often a manual process performed by visual examination by an observer of the captured footage. Where a large amount of video footage has been captured, manually determining which image frames contain activity of interest can be inefficient, time and labor consuming, and vulnerable to subjectivity, omission, and error.

BRIEF DESCRIPTION OF THE DRAWINGS

Various techniques will be described with reference to the drawings, in which.

DETAILED DESCRIPTION

Techniques and systems described below relate to detecting activity of interest in a sequence of image frames. In an example, a sequence of images is captured by an image capture device, where the sequence of images include a first image frame and a second image frame. In the example, the first image frame and the second image frame are aligned based at least in part on a static feature common to the first image frame and the second image frame. Further in the example, a region of interest common to both the first image frame and the second image frame is selected. In the example, a difference image is generated based at least in part on the first image frame, the second image frame, and the region of interest. Also in the example, a first motion value is computed based at least in part on a sum of pixel values in the difference image. Additionally, in the example a second motion values is computed based at least in part on the sequence of images. Finally, in the example, an indication of whether an activity of interest has started or stopped based at least in part on a determination that one but not both of the first motion value and the second motion value have reached a value relative to a threshold is stored in association with the sequence of images.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of digital image analysis, by efficiently determining whether digital representations of objects in a sequence of images relate to an activity of interest.

Additionally, techniques described and suggested in the present disclosure improve the efficiency and accuracy of computer-based object detection system by enabling more efficient and accurate detection, selection, and extraction of high-motion segments from raw video. Moreover, techniques described and suggested in the present disclosure are necessarily rooted in computer technology in order to overcome problems specifically arising with efficiently detecting motion of objects within large sequences of images (e.g., hundreds of thousands of image frames) by de-emphasizing spectral characteristics of background objects and isolating the frequency of the objects of interest.

Figure 1:
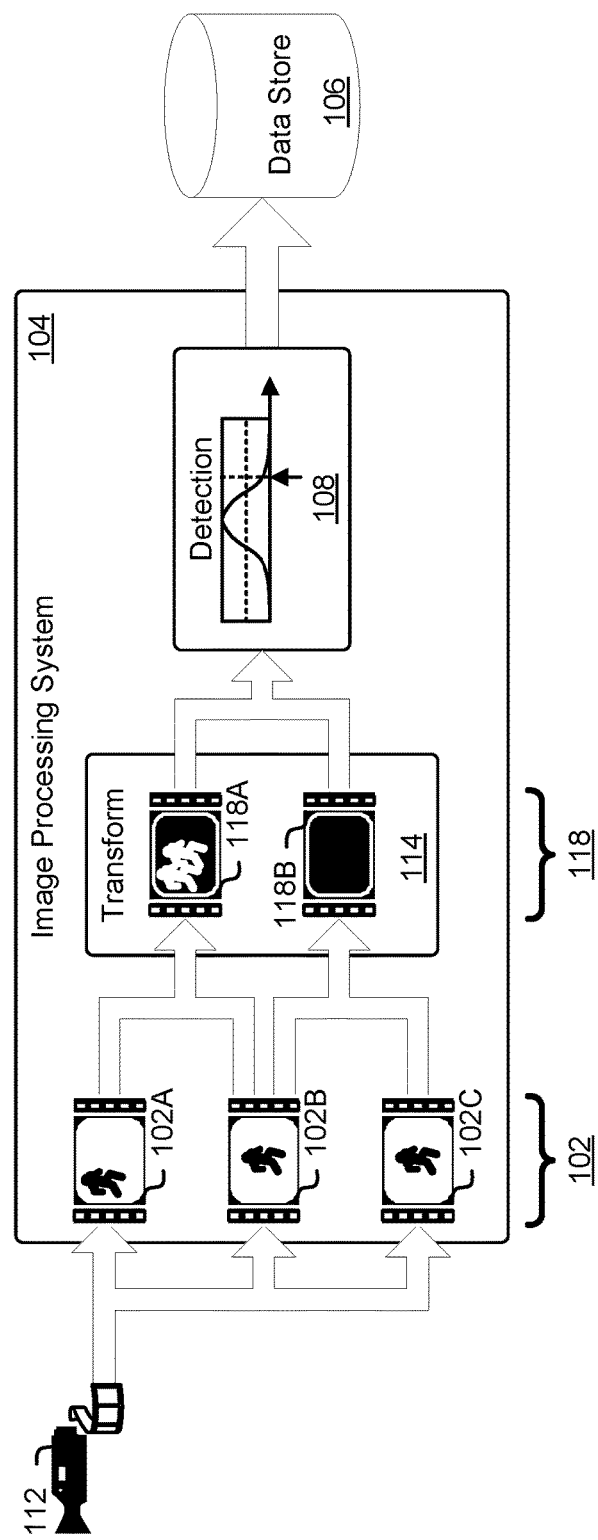
FIG. 1 illustrates an example of detecting activity of interest in a sequence of images in accordance with an embodiment.

FIG. 1 illustrates an example 100 of detecting activity of interest in an embodiment of the present disclosure. Specifically, FIG. 1 depicts an image processing system 104 that obtains a sequence of images 102 captured by an image capture device 112. An image transformation system 114 transforms the images 102 and takes their difference to produce difference images 118 from which a motion value can be derived. An activity detection system 108 determines, based on the motion value, whether the images 102 depict an ongoing activity of interest and outputs to a data store 106 an indication of whether the images 102 depict the activity of interest.

In an embodiment, the images 102 may each be a two-dimensional image of a scene captured by an image capture device. In embodiments, the images are members (i.e., image frames) of a sequence of images comprising a video recording of the scene. In an embodiment, the images 102 are a numeric (e.g., binary) representation of a two-dimensional image that comprises a set of picture elements (pixels). The images 102 may contain a fixed number of rows and columns of pixels having values that represent the hue and/or brightness at that specific point. In an embodiment, the images 102 are formatted according to a specific image format, such as Graphics Interchange Format (GIF), Joint Photographic Experts Group (JPEG), Portable Network Graphics (PNG), bitmap (BMP), or Tagged Image File Format (TIFF). In an embodiment, the images 102 are members of a sequence of image frames captured during a video capture event of a scene.

In an embodiment, the image capture device 112 is a device for electronic motion picture acquisition or electronic still picture acquisition. In embodiments, the image capture device 112 is designed to acquire a picture (also referred to as an image) by focusing light on a light-sensitive surface, such as a charge-coupled device (CCD) or complementary metal-oxide-semiconductor (CMOS) chip. In embodiments, the image capture device 112 includes an image sensor (e.g., CCD, CMOS chip, microbolometer, etc.), memory, image processing capability, and/or a microphone. In an embodiment, the image capture device 112 is designed to record and/or communicate a digital or analog stream of media (e.g., audio, video, text, or any combination of audio, video, or text) in a manner such that the media can be replayed or reproduced on a device designed to display such media. Examples of such image capture devices include a digital video camera, a web camera, mobile telephone, and so on.

In embodiments, the image capture device 112 is capable of acquiring a picture from light within the visible spectrum (e.g., wavelengths from 390 to 700 nanometers). In some embodiments, the image capture device 112 is additionally or alternatively capable of capturing light in the non-visible spectrum (e.g., infrared, ultraviolet, etc.). For example, the image capture device 112 may be a thermal imaging camera or other thermographic camera capable of rendering infrared radiation as visible light. In embodiments, the image capture device 112 is stationary. However, it is contemplated that certain techniques of the present disclosure can be applied to non-stationary image capture device. For example, a non-stationary recording device may follow an object in motion (e.g., keeping the object within its field of view).

In an embodiment, the image processing system 104 includes one or more computing devices and application software that executes to process a sequence of images to determine which of the sequence of images depict activity of interest among objects represented in the sequence of images. In embodiments, activity of interest refers to an amount of activity of one or more objects depicted in a sequence of images that exceeds a threshold amount of activity. For example, the sequence of images may be a video recording of an American football game and the activity of interest may be the execution of a play from scrimmage during the game. Note that it is contemplated that the techniques described in the present disclosure may be applied to other fields besides sports; for example, determining activity of interest from video footage could be applied in the study of automotive crashes, chemical reactions, activity of biological organisms, and so on. That is, because the threshold may be used to identify periods of high activity relative to other activity captured within the sequence of images, the activity itself may occur at high speed or low speed. For example, the blooming of a flower may appear to progress slowly in real time, but over a long sequence of images capturing the growth of the flower over time, the blooming may occur rapidly as compared to the growth of the flower overall; such activity (e.g., the blooming) may be dynamically identified by the image processing system 104 of the present disclosure.

In embodiments, the image processing system 104 identifies which images of the sequence of images depict activity of interest (e.g., having an amount of activity above the threshold). In some embodiments, the image processing system 104 additionally or alternatively identifies the start and end image frames of the activity of interest. The image processing system 104 may indicate the start and end image frames (and additionally or alternatively the image frames associated with the activity of interest) in the data store 106. In some embodiments, the image processing system 104 includes one or more subsystems, such as the image transformation system 114 and/or the activity detection system 108.

In an embodiment, the data store 106 is a repository for data objects, such as database records, flat files, and other data objects. Examples of data stores include file systems, relational databases, non-relational databases, object-oriented databases, comma delimited files, and other files. In some implementations, the data store 106 is a distributed data store. In some embodiments, the data store 106 stores the sequence of images, whereas in other embodiments the sequence of images is stored elsewhere.

In an embodiment, the image transformation system 114 includes one or more computing devices and/or application software that executes to transform one or more of the images 102 according to one or more filters or algorithms. For example, the image transformation system may identify a dominant hue in one of the images 102 and transform the image by reducing (e.g., setting to zero) the luminosity and/or saturation values of pixels having the dominant hue, such as in the manner described in U.S. patent application Ser. No. 16/203,457, entitled "SPECTRAL SELECTION AND TRANSFORMATION OF IMAGE FRAMES,", incorporated herein by reference, to provide for more efficient object detection and motion analysis. Additionally or alternatively, the image transformation system 114 may perform filtering algorithms as described in the U.S. patent application Ser. No. 16/203,457 incorporated herein by reference, to produce a high frequency image that emphasizes objects of interest in the image.

In embodiments, the image transformation system 114 further performs one or more of these transformations to each of two adjacent image frames in the sequence of images, such as first image 102A and second image 102B, and produces a difference image 114A from the transformed images such as in the manner described in the U.S. patent application Ser. No. 16/203,457, incorporated herein by reference. To illustrate, the example 100 depicts an object (e.g., a football player) in motion between the capture of the first image 102A (football player is on the left side of the image) and the second image 102B (football player has run to approximately the middle of the image).

In an embodiment, the difference images 118 are a set of pixel values that represent the absolute difference between corresponding pixel values of two adjacent images in the sequence of images. In some embodiments, to provide for a more accurate calculation of the differences, the image transformation system 114 aligns the first image 102A and the second image 102B to compensate for spatial jitter that may have occurred between the image captures. In some embodiments, the alignment is performed by aligning the first image 102A and the second image 102B such that a specified static feature in each of the images 102A-02B is aligned, such as in the manner described in U.S. Pat. No. 10,594,940, entitled "REDUCTION OF TEMPORAL AND SPATIAL JITTER IN HIGH-PRECISION MOTION QUANTIFICATION SYSTEMS," incorporated herein by reference. In some of these embodiments, common region between the images 102A-02B is determined, and regions which are not common (e.g., edges of the images) to both 102A-02B are cropped, as also described in the U.S. Pat. No. 10,594,940, entitled "REDUCTION OF TEMPORAL AND SPATIAL JITTER IN HIGH-PRECISION MOTION QUANTIFICATION SYSTEMS,", incorporated herein by reference, so as to preclude the non-common regions from affecting the differences determined in the first difference image 118A. As another benefit, excluding the non-common regions reduces the number of pixels of the images 102A-02B needing to be analyzed, which may result in more efficient determination of the activity of interest overall.

In embodiments, the image transformation system 114 takes a sum of the absolute differences between pixels of the first image 102A (or its transformed image) and corresponding pixels of the second image 102B (or its transformed image) to produce a first difference image 118A. As can be seen in the first difference image 118A, the difference between the backgrounds of the first image 102A and the second image 102B is low because the background is relatively stationary, and as a result the pixel differences in the first difference image 118A corresponding to the common background areas of the images 102A-02B is low (e.g., rendered as black or nearly black). On the other hand, the differences between pixels of the object in motion are relatively high, and, as a result, silhouettes of the object at both positions appear in the first difference image 118A.

As can be seen in the example 100 illustrated in FIG. 1, the object in the second image 102B is still more or less in the same position in third image 102C, indicating that the object (e.g., the football player) has moved relatively little between the capture time of the images (e.g., the football player stopped running). As with the images 102A-02B, in embodiments, the image transformation system 114 aligns the images 102B-02C with a static feature present in the images 102B-02C to reduce spatial jitter. Likewise, in some embodiments, a common region between the images 102B-02C is determined and portions of the images (for the purposes of computing the second difference image 118B and for reducing the size of the images being processed) not within the common region are cropped. Thus, as a result of the image transformation system 114 taking a sum of the absolute differences between pixels of the second image 102B (or its transformed image) and corresponding pixels of the third image 102C (or its transformed image), a second difference image 118B is produced that does not indicate many differences between the images 102B-02C (e.g., rendered as nearly black).

In an embodiment, the activity detection system 120 includes one or more computing devices and/or application software that executes to determine, based on motion values derived from the difference images 118 whether activity of interest is occurring (e.g., the objects of interest are in a high activity state), is not occurring, is beginning, or has ended. In some embodiments, a motion value for the first difference image 118A is a sum of the pixel values of the first difference image 118A (e.g., a sum of the differences between the images 102A-02B). In some embodiments, the sum of the pixel values is weighted to compensate for temporal jitter, such as in a manner described in the U.S. patent application Ser. No. 15/870,678, entitled "REDUCTION OF TEMPORAL AND SPATIAL JITTER IN HIGH-PRECISION MOTION QUANTIFICATION SYSTEMS,", incorporated herein by reference. Compensating for temporal jitter normalizes the motion values such that images of the sequence of images that were captured at a rate more quickly than the average rate of capture of the sequence of images are not penalized with a lower motion value, while images of the sequence of images that were captured at a rate more slowly than the average rate of capture of the sequence of images are not rewarded with a higher motion value.

Likewise, in some embodiments, a motion value for the second difference image 118B is a sum of the pixel values of the second difference image 118B (e.g., a sum of the differences between the image 102B-02C). Likewise, in some embodiments, this motion value is weighted to compensate for temporal jitter between the capture times of the images 102B-02C.

In the example 100 illustrated in FIG. 1, it can be seen that there are more differences exhibited in the first difference image 118A than are exhibited in the second difference image 118B. Consequently, the motion value computed for the first difference image 118A may be higher than the motion value computed for the second difference image 118B. The activity detection system 108 may determine whether the motion value computed for the first difference image 118A is above a threshold, and if so, may determine that an activity of interest is occurring within one or both of the images 102A-02B. Likewise, the activity detection system 108 may determine whether the motion value computed for the second difference image 118B is below the same (or different) threshold, and, if so, may determine that an activity of interest is not occurring within one or both of the images 102B-02C.

For example, if motion values for difference images 118A-18B are both above the threshold, the activity detection system 108 may determine that activity of interest is actively occurring in the images 102. On the other hand, if motion values for the difference images 118 are both below the same (or different threshold), the activity detection system 108 may determine that the activity of interest is not occurring in the images 102. However, if one, but not both, of the motion values for the difference images 118A-18B have reached a value relative to the threshold (e.g., at or above the threshold), it may indicate a start or end of the activity of interest.

For example, if the motion value for the first difference image 118A is above the threshold, whereas the motion value for the second difference image 118B is below the same (or different) threshold, the activity detection system 108 may determine that the activity of interest has ceased (e.g., changed from a high amount of motion to a low amount of motion). Consequently, the activity detection system 108 may store an indication (e.g., a flag value, an image frame number or identifier, value indicating an activity state, etc.) in the data store 106 that indicates that the second image 102B, being the common image to both difference images 118A-18B, is the endpoint of the activity of interest (i.e., the last image in the sequence of images corresponding to the activity of interest). Conversely, if the motion value for the first difference image 118A is below the same (or different) threshold but the motion value for the second difference image 118B is above the threshold, the activity detection system 108 may determine that the activity of interest has started (e.g., changed from a low amount of motion to a high amount of motion). As a result, the activity detection system 108 may store an indication (e.g., a flag value, an image frame number or identifier, value indicating an activity state, etc.) in the data store 106 that indicates that the second image is the starting point of the activity of interest (i.e., the first image in the sequence of images corresponding to the activity of interest). Note that it, however, contemplated that embodiments are possible where a high motion value indicates low motion and vice versa.

In an embodiment, the threshold or thresholds are specified by a user (e.g., via a user interface). In some embodiments, a threshold for the motion value may be derived from a mean (average) of the motion values of the sequence of images. For example, a high threshold may be derived from a standard deviation above the mean (e.g., half a standard deviation, one standard deviation, two standard deviations, etc.), a medium threshold may be the mean, and/or a low threshold may be derived from a standard deviation below the mean.

In some embodiments, the difference between motion values may be used to generate an impact score. The impact score may be a value indicating a possibility that one or more objects involved in the activity of interest may have suffered damage or injury (e.g., concussion, whiplash, etc.). For example, a sudden drop/deceleration (e.g., difference in motion values greater than a threshold) in activity may indicate the possible occurrence of a hard collision between objects represented in the images. Similarly, a sudden increase/acceleration of activity as captured by the impact score may be an indication of possible damage (e.g., stationary object suddenly struck/propelled). Thus, larger impact scores may reflect an increased possibility of damage having been caused by the sudden acceleration/deceleration of activity.

In some embodiments, if the impact score exceeds an impact threshold, one or more actions may be taken. For example, an action may be to flag (e.g., record an entry in a data store) the images associated with the impact score to alert a human operator of the possibility of a hard collision occurring at those images in the sequence of images. For example, if the end of a sports play resulted in an impact score above an impact threshold, the system of the present disclosure may flag the play for further review by a sports medical team. Another example of an action is to send a notification (e.g., text message, email, voice message, network notification, etc.) to an address associated with a user. In this manner, an individual can be alerted to inspect the objects involved in the sudden acceleration/deceleration for damage (e.g., examine the players for injuries).

In some embodiments, the impact score may be specified (e.g., via an interface) by a user. As still another example, the system may provide the impact score to a user and query the user whether damage occurred as a result of the sudden acceleration/deceleration. In this manner, the impact score and answer to the query may be provided as training data to a machine learning algorithm directed to determining accurate impact thresholds and likelihood of damage based on the impact score and/or other data.

Additional data, such as the number of objects depicted, motion values, and so on, may also be provided as training data to a machine-learning algorithm in order to increase the accuracy in determining whether a damaging collision has occurred. In various embodiments, the data may be analyzed using one or more machine learning algorithms. Such machine learning algorithms may include supervised learning techniques, unsupervised learning techniques, semi-supervised learning techniques, transduction or transductive inference techniques, reinforcement learning, developmental learning, and the like. In various embodiments, the data may be analyzed using one or more machine learning algorithm, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms. For example, set of decision trees can be generated from historical data by splitting historical data into subsets based on an attribute value test and partitioning the data recursively until the splitting no longer adds value to the predictions.

Figure 2:
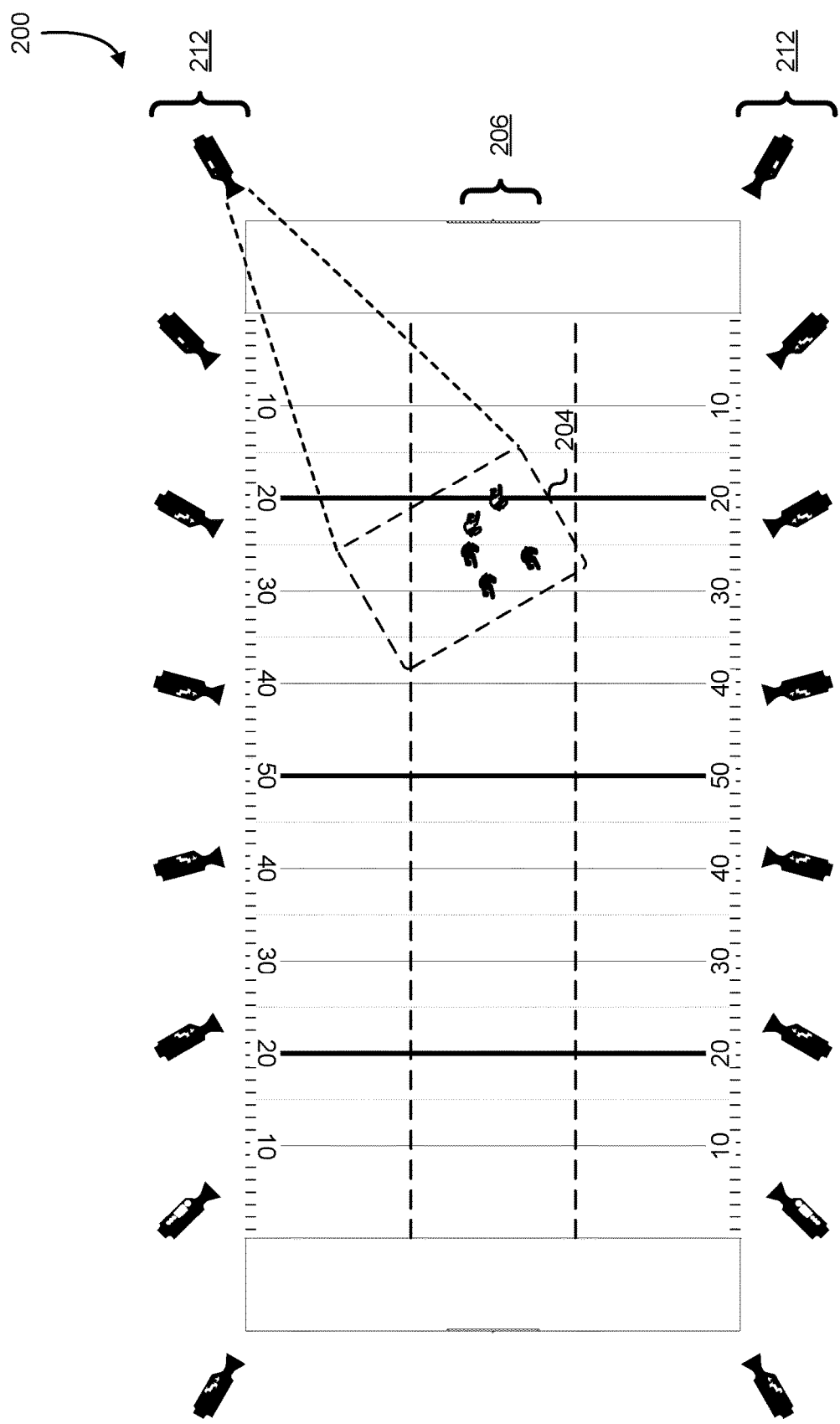
FIG. 2 illustrates an example of an environment from which images are capture in accordance with an embodiment.

FIG. 2 illustrates an example of an environment 200 in which an embodiment may be practiced. As illustrated in FIG. 2, the environment 200 depicts, as a set of image capture devices 212, sixteen video cameras each having a field of view of the environment 200. Although the fields of view of the other fifteen video cameras are not illustrated, the field of view 204 for one of the image capture devices includes a set of objects 206 within it. The environment 200 is depicted in FIG. 2 as being a sports field for illustration purposes, and it is contemplated that techniques described in the present disclosure can be applied to various other types of environments. In an embodiment, the environment 200 is a real (e.g., non-virtual) location, at least a portion of which is being recorded as a sequence of images by one or more image capture devices (e.g., the set of image capture devices 212). For example, FIG. 2 depicts a sports field as one example of the environment 200. However, FIG. 2 is intended to be illustrative only, and it is contemplated that techniques of the present disclosure may be used in other types of physical environments, such as in areas under surveillance by security cameras, roads and/or other areas being recorded by image sensors on an automobile, etc.

In an embodiment, the fields of view are the extent of the environment 200 that is captured by the set of image capture devices 212. The fields of view may be solid angles (e.g., two-dimensional angles in three-dimensional space that an object subtends at a point) through which elements (e.g., pixel sensors) of the set of image capture devices 212 are sensitive to light at any one time. Field of view 204 is an example of a field of view of one of the set of image capture devices 212. In an embodiment, the each of the set of image capture devices 212 is a device similar to the image capture device 112 of FIG. 1.

In an embodiment, the set of objects 206 is one or more objects of interest that are within the field of view 204 of one of the image capture devices 212. In some embodiments, the set of objects 206 are individuals, such as members of sports teams in the environment 200. However, it is also contemplated that techniques of the present disclosure are applicable with set of objects 206 that are either animate or inanimate, and/or include one or more of a living (e.g., animal, plant, etc.) or non-living entity (e.g., boulder, automobile, building, etc.).

In some implementations, the set of objects 206 have certain visual characteristics (e.g., shape, color, pattern, etc.) usable by systems of the present disclosure to distinguish the set of objects 206 from the background of the environment 200 and/or from objects that are not of interest in the particular application of these techniques. For example, in an example implementation, the set of objects 206 are helmets worn by the sports players in the environment 200. The helmets may have characteristics of being of particular shape and/or color). Based on these characteristics, background objects (e.g., the sports ball, goal posts, hash marks, umpires, grass texture, spectators, etc.) incidentally captured in images captured by the set of image capture devices 212 may be filtered out in transformed images using techniques described in the present disclosure.

In some applications, members of the set of objects 206 are generally homogeneous. In some examples, the term "homogenous" refers to uniformity (e.g., size, color, or shape) within an image such that one object of the set of objects 206 is not consistently visually identifiable from another of the objects. Within an image, the object may be represented by a set of pixels, with the size of the set of pixels being affected both by the distance of the image capture device from the object as well as the resolution of the image. For example, during a sports game players of a particular team wear helmets of the same size, shape, and color combination, and a set of pixels representing the helmet of one player may not include sufficient distinguishing characteristics to distinguish it from a set of pixels representing the helmet of another player. An object may be considered homogenous even if it includes certain distinguishing visible characteristics if such the object is not distinguishable from other of the objects due to the positions and orientations of the objects. For example, players of a particular sports team may wear uniform with the same colors and/or patterns as other players, but may have numbers and/or names printed on the uniform for identification purposes. Yet, in any given image, an identifying mark may be obscured or turned away from an image capture device such that the identity of the object (e.g., player) is uncertain.

Figure 3:
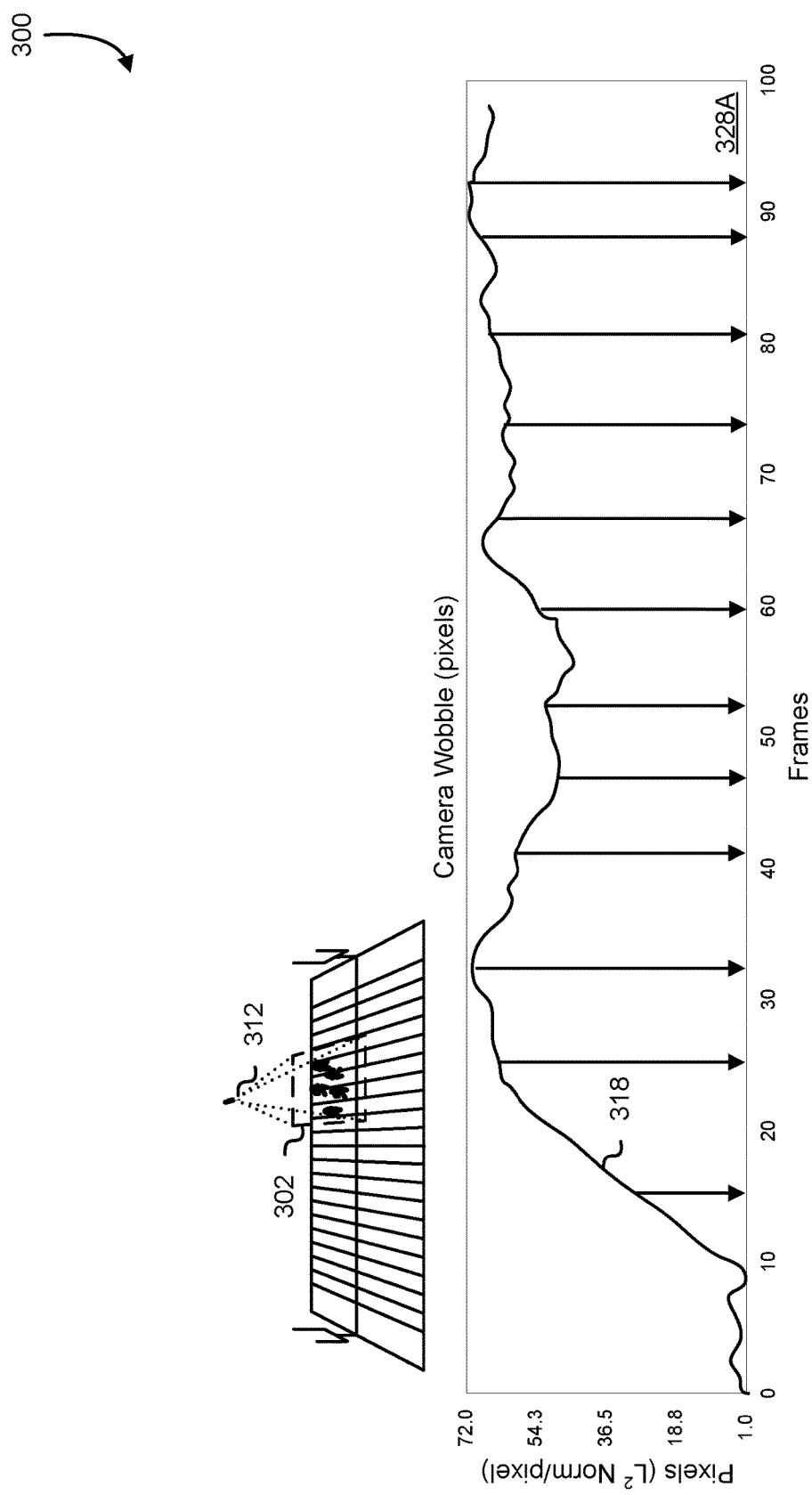
FIG. 3 illustrates an example of normalizing spatial jitter in accordance with an embodiment.

FIG. 3 illustrates an example 300 of spatial jitter normalization of an embodiment of the present disclosure. Specifically, FIG. 3 depicts a graph 328 of an amount of camera wobble 318 for each frame of a contiguous sequence of 100 frames of a scene 302 recorded by a device 312 such as the image capture device 112 of FIG. 1. In an embodiment, the scene 302 is a scene recorded in a sequence of image frames. In the example 300, the scene 302 is illustrated to be a recording of at least a portion (e.g., 100 image frames) of a sporting event. However, it is contemplated that the techniques of the present disclosure may be applied to various other types of events (e.g., property surveillance, traffic accident monitoring, etc.).

In an embodiment, the graph 328 is a graphs reflecting the motion jitter captured during the image capture event. For example, the graph 328 may be a graph reflecting a pixel displacement between image frames caused by camera jitter (wobble). In some embodiments, the amount of camera jitter may be a Manhattan distance (also known as a taxicab distance) of the displacement; e.g., a sum of the absolute horizontal and vertical differences between a pixel in a first image frame and a pixel in a second image frame.

In an embodiment, the camera wobble 318 displays an amount (e.g., in pixels) that an image of the scene 302 has drifted away from the view in another image. The camera wobble 318 may be measured by calculating the difference between a position of a static feature in one image and a position of the static feature in the other image. Because the static feature is presumed to be stationary, the difference is attributed to motion of the camera (e.g., due to wind, vibration. For example, a first image frame (e.g., frame 0) may be designated as the baseline image for an anchor location of the static feature. For each successive image frame, the static feature in the successive image frame may be aligned with the static feature. As can be seen in the example 300, frame 0, being the baseline image, has a wobble of 0 pixels. However, over time, the video capture device appears to drift, such that the static feature around frame 90 is displaced by 72.0 pixels from the anchor location of the static feature in the baseline image. By aligning the static features in the frames of the sequence of image capture frames, this drift (camera wobble) may be removed (e.g., reduced to zero; normalized). In an embodiment, the difference images between each image frame and/or pixel distances may then be calculated for the common regions of the frames as described in the present disclosure. Although the graph 328 illustrates an implementation where the first image frame (frame 0) is the baseline image, it is contemplated that the baseline image may be designated from any image frame in the sequence.

Figure 4:
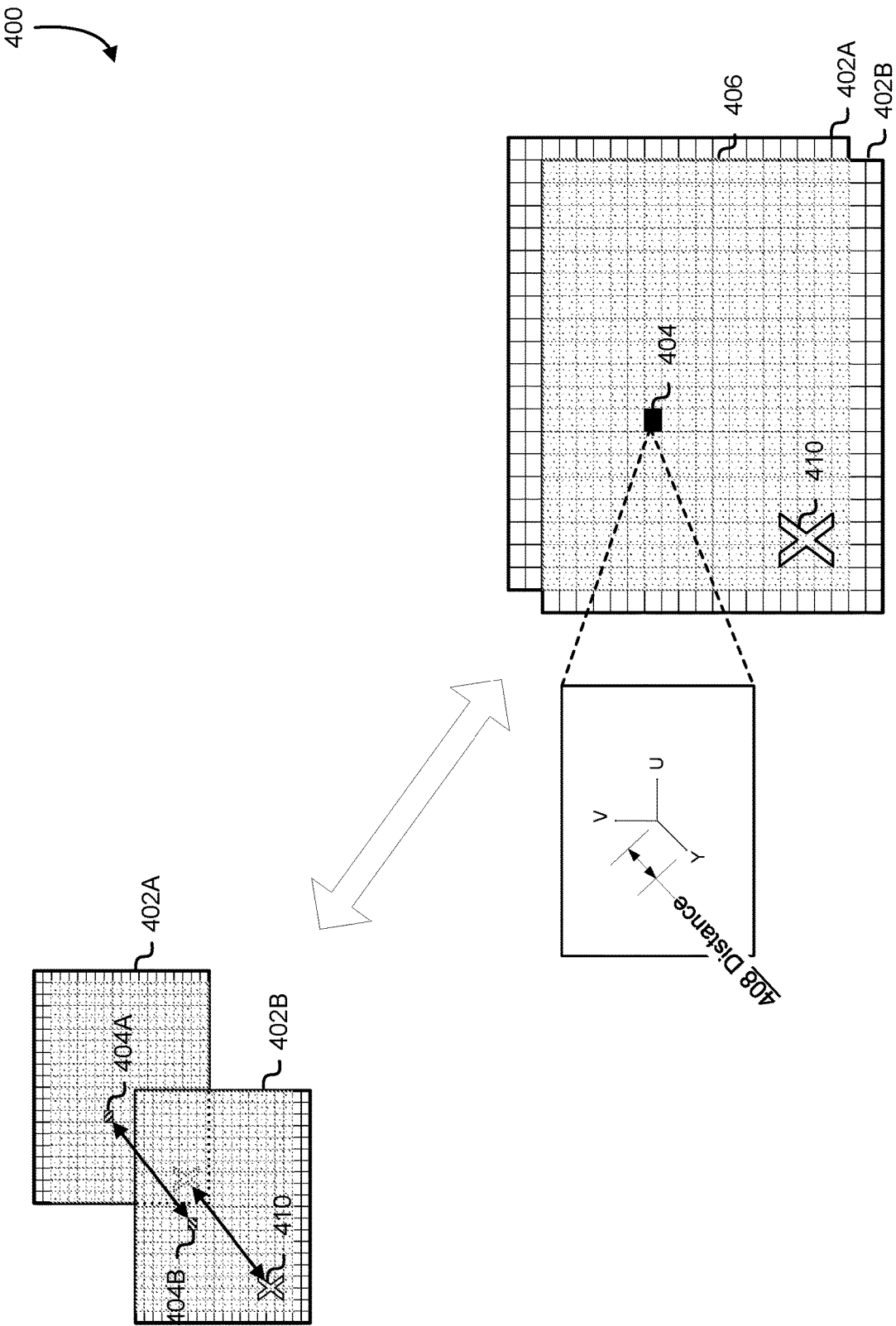
FIG. 4 illustrates an example of determining pixel distances between frames in accordance with an embodiment.

FIG. 4 illustrates an example 400 of an embodiment of the present disclosure. Specifically, FIG. 4 depicts images 402A-02B of a sequence of image frames from a video capture event recorded by an image capture device, such as the image capture device 112 of FIG. 1. In an embodiment, the system of the present disclosure identifies a static feature 410 present in the images 402A-02B and uses the static feature 410 to align the images 402A-02B in order to mitigate any spatial jitter (also referred to as spatial wobble) experienced by the image capture device between captures of the images 402A-02B.

In an embodiment, the images 402A-02B are images of a sequence of images. In an embodiment, the first image 402A is captured by an image capture device, such as the image capture device 112 of FIG. 1 at a first time, whereas the second image 402B is captured by the same image capture device at a second time during where the image capture device wobbled between the first time and the second time. In an embodiment, the pixels 404A-04B corresponding pixels in the images 402A-02B. That is, the first pixel 404A in the first image 402A corresponds to the second pixel 404B in the second image 402B after the offset determined by aligning the static feature 410 is accounted for.

In an embodiment, the common region 406 is a region of pixels that represent the same portion of the scene between both images 402A-02B. In order to normalize the spatial jitter of the video capture device 412, the images 402A-02B are aligned to a static feature 410 that is common to both image frames. Thus, as can be seen, after the static features 410A-10B are aligned, pixels on the bottom and left side of the second image 402B are of a region shared by the first image 402A; likewise, pixels on the top and right of the first image 402A are not of a region in common with the second image 402B. Thus, the common region 406 includes the area of the scene that both images 402A-02B have in common.

In an embodiment, the distance 408 is a in the example 400 is a distance between color value (rather than a distance in position). For example, the images 402A-02B may be aligned and a difference in color values may be determined between the corresponding pixels 404A-04B in the common region 406 of each image frame. In other words, given the common region 406 determined, a first pixel 404A in the first image 402A may correspond to a second pixel 404B in the second image 402B. Thus, the distance 408 may be as absolute difference between one or more components (e.g., luminance/brightness, luminosity/lightness, hue, etc.) of the color of the first pixel 404A the same one or more components of the color of the second pixel 404B. In an embodiment, the resulting difference between the common region in the first image 402A and the second image 402B may be a set of values comprising a difference image, such as described in U.S. patent application Ser. No. 15/870,678, entitled "REDUCTION OF TEMPORAL AND SPATIAL JITTER IN HIGH-PRECISION MOTION QUANTIFICATION SYSTEMS,". In embodiments, an amount of motion between two frames may be derived from the difference image; for example, the sum of the set of values comprising the difference image may be considered as the amount of motion between the two frames.

In an embodiment, the static feature 410 is an object, pattern, texture, or some otherwise recognizable visual characteristic in the scene that is understood to be stationary throughout at least the portion of the video capture event in which normalization of spatial jitter is performed as described in the present disclosure. Examples of the static feature may be goal posts on a sports field, a corner of a building, a stationary logo, etc. In an embodiment, there is more than one static feature designated in the scene. However, ideally each static feature is distinguishable (e.g., by a computing device using edge and pattern detection) from image frame to image frame; e.g., an occurrence of the static feature should not appear more than once in a given image frame.

In an embodiment, the static feature 410 of each of the images 402A-02B is aligned and a common region 406 to each of the images 402A-02B is identified. In implementations, the image frames are aligned by determining, based on an amount of offset between the positions of the static feature 410 in a first image 402A and the static feature 410 in a second image 402B, and using the offset to determine for each pixel in the first image 402A which pixel in the second image 402B corresponds to the pixel in the first image 402A. That is, the pixel in the second image 402B that corresponds to the pixel in the first image 402A may be located at a position determinable using the offset. By aligning the images 402A-02B before determining the distance 408 between the pixels 404A-04B, the effects of spatial jitter by the image capture device can be reduced, thereby allowing for a more accurate calculation of the distance 408 between the pixels 404A-04B.

Figure 5:
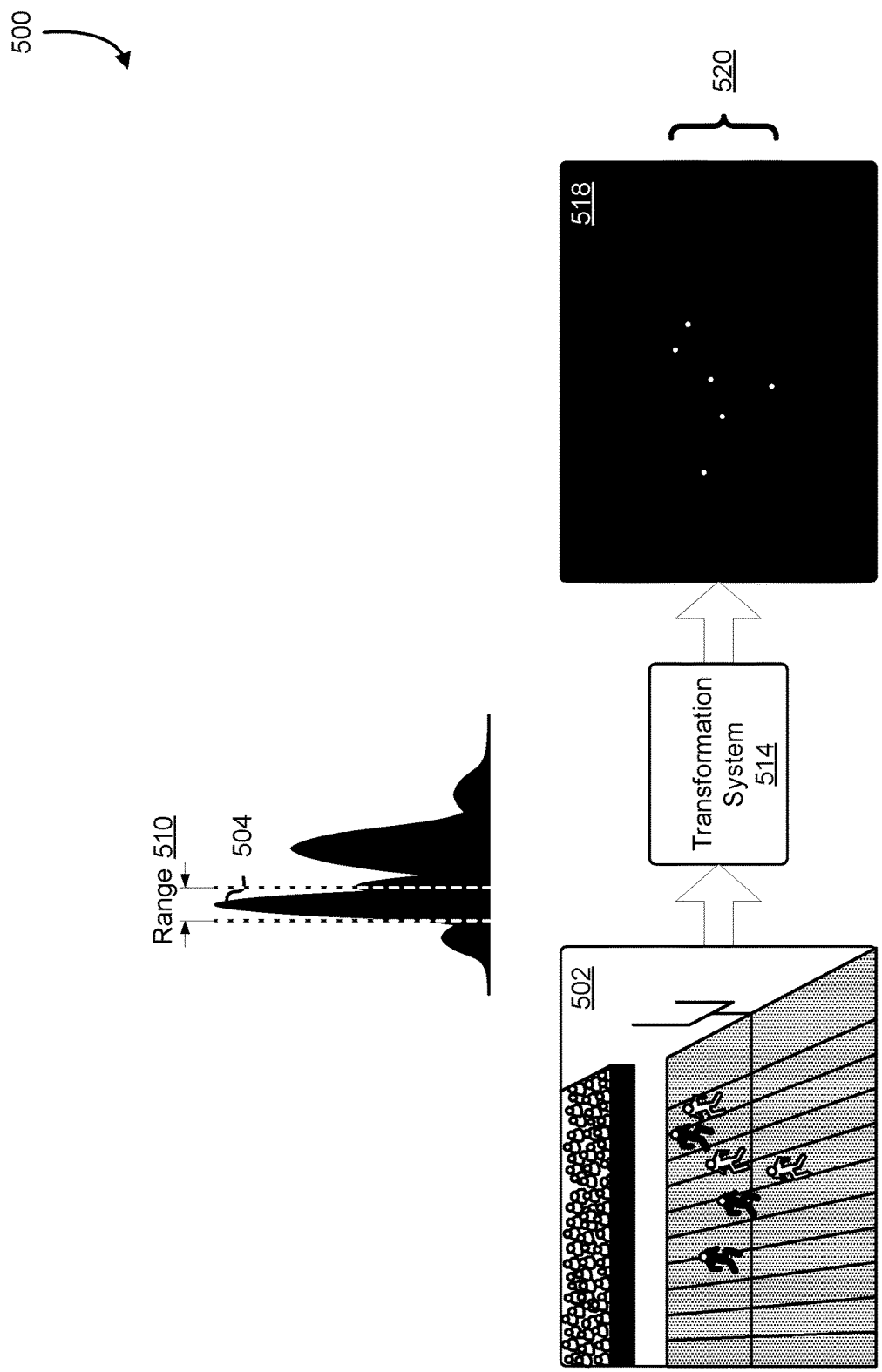
FIG. 5 illustrates an example of performing spectral and spatial transformation to an image in accordance with an embodiment.

FIG. 5 illustrates an example 500 embodiment of spectral selection of an embodiment of the present disclosure. Specifically, FIG. 5 depicts an initial image 502 that is transformed into a transformed image 518 by performance of a spectral and/or spatial transformation process by an image transformation system 514. In some of these embodiments, the color model used in the spectral and/or spatial transformation process is a hue, saturation, value (HSV) color model. It is contemplated, however, that techniques of the present disclosure may be used with various other color spaces and models, such as Y'UV, YCbCr, YPbPr, or YCoCg.

In an embodiment, the initial image 502 is comprised of a set of pixels that each has a color value, such as a value for a hue. In an embodiment, the hue is one of the three coordinates of a color model that describes a color component as a tuple of numbers that represent the degree to which a color appears to be similar to colors of red, green, blue, yellow or a combination of two such colors.

In an embodiment, the image transformation system 514 may be similar to the image transformation system 114 of FIG. 1. In an embodiment, the image transformation system 514 analyzes the initial image 502, counts of the number of times each hue occurs within the initial image 502, and determines the dominant hue 504. In an embodiment, the dominant hue 504 is a hue that occurs with the most frequency within the initial image 502. It is also contemplated, however, that there may be multiple dominant hues (e.g., most frequent, next most frequent, etc.) determined for the initial image 502. For example, for illustration purposes, the initial image 502 is shown to depict a sports event, and because the sports field comprises a large part of the initial image 502, the image transformation system 514 may determine that the dominant hue 504 is a value representing a particular hue of green of the sports field.

In an embodiment, the hue range 510 is a range of hues, including the dominant hue 504, whose color values are to be modified by the image transformation system 514. For example, in the initial image 502, the dominant hue may be a particular hue of the green grass in the sports field. However, the green grass of the sports field may vary slightly in hue, and consequently the hue range 510 of hues may encompass more hues than one dominant hue in order to capture most if not all of the hues of the green grass of the sports field. In some embodiments, the hue range 510 includes the dominant hue 504 and a few degrees of hues before and after the dominant hue 504. In some embodiments, the number of hues included before and after the dominant hue 504 can be specified by a user or determined dynamically based on the image transformation system 514 analysis of the image.

In embodiments, the image transformation system 514 reduces the complexity of the initial image 502 by modifying one or more color components (e.g., reducing lightness/luminosity to zero, increasing saturation to 100%, etc.) of pixels in the initial image 502 that are within the hue range 510. This process may be referred to in the present disclosure as spectral transformation. In the example of the sports field, the result of the spectral transformation may be that the sports field becomes rendered as a near uniform hue of black, grey, or white (depending on the color characteristic modified and in which direction). In embodiments without spatial transformation applied to the image, the resultant image is the transformed image 518 with the hues of the initial image 502 within the hue range 510 filtered out.

In an embodiment, the image transformation system 514 additionally or alternatively performs spatial transformation to the image. In the spatial transformation process, the image transformation system 514 applies a smoothing, such as a Gaussian blur function, de-noising function (e.g., the median filter), or other function that reduces spatial high frequency contents of the initial image 502 to reduce image noise and detail to produce a low frequency image. In an embodiment, the image transformation system 514 further determines the differences between the low frequency image and the un-smoothed image in a similar manner to producing the difference image described above to produce a high frequency image; that is, the difference between each pixel in the us-smoothed image and its corresponding pixel in the low frequency image results in the high frequency image. As a result, whereas edges and details in the low frequency image de-emphasized, such edges and details are, in contrast, emphasized in the high frequency image.

In some embodiments, the image transformation system 514 performs the spatial transformation to the initial image 502 prior to application of the spectral transformation. In other embodiments, the image transformation system 514 performs the spatial transformation after the spectral transformation has been performed. In still other embodiments, additionally or alternatively, the image transformation system applies the spatial transformation to the difference image produced from the initial image 502 (spectrally transformed or untransformed) and an adjacent image.

The image transformation system may perform the spatial transformation process described above iteratively until to narrow the image frequency to a band at which the objects of interest 520 can be efficiently detected, but excludes image noise and smaller objects, such as described in U.S. patent application Ser. No. 15/870,678, entitled "REDUCTION OF TEMPORAL AND SPATIAL JITTER IN HIGH-PRECISION MOTION QUANTIFICATION SYSTEMS,", to produce the transformed image 518. In embodiments that do not utilize spectral transformation, or utilizes spectral transformation at a different stage in the image processing system 104 of FIG. 1, the spatial transformation process is performed to the initial image 502.

In an embodiment, the transformed image 518 is an image derived by performing spectral transformation and/or spatial transformation on the image data of the initial image 502 as described in the present disclosure. As shown in the example 500, the transformed image comprises the objects of interest 520 while other features that were in the initial image 502 (e.g., sports field, fans, player bodies, field lines, etc.) have been de-emphasized or removed.

In an embodiment, the objects of interest 520 are digital representations in the final spatially transformed image 518 of objects to be being analyzed by the system of the present disclosure for activity of interest. For example, in the example 500, the objects of interest 520 may be helmets of the sports players within the scene. Tracking such objects may be useful for studying kinematics (e.g., the geometry of motion) of the players on the sports field. Thus, there may be a plurality of objects comprising the objects of interest 520, and the objects of interest 520 may have similar characteristics to each other (e.g., similar in size, shape, color, etc.). In this manner, although the objects of interest 520 themselves may be relatively homogenous, the objects of interest 520 may be different from other objects (not of interest) in the scene, such as the sports ball, fans in the stands, players on the bench not wearing helmets, the referees, and the rest of the bodies of the players. In an embodiment, these shared characteristics, however, allow performance of the spatial transformation processes described in the present disclosure to determine that the transformed image 518 contains the objects of interest (e.g., by detecting whether objects having the shared characteristics remain in the transformed image 518 after the spatial transformation process is applied) while excluding noise and at least some objects not of interest.

Figure 6:
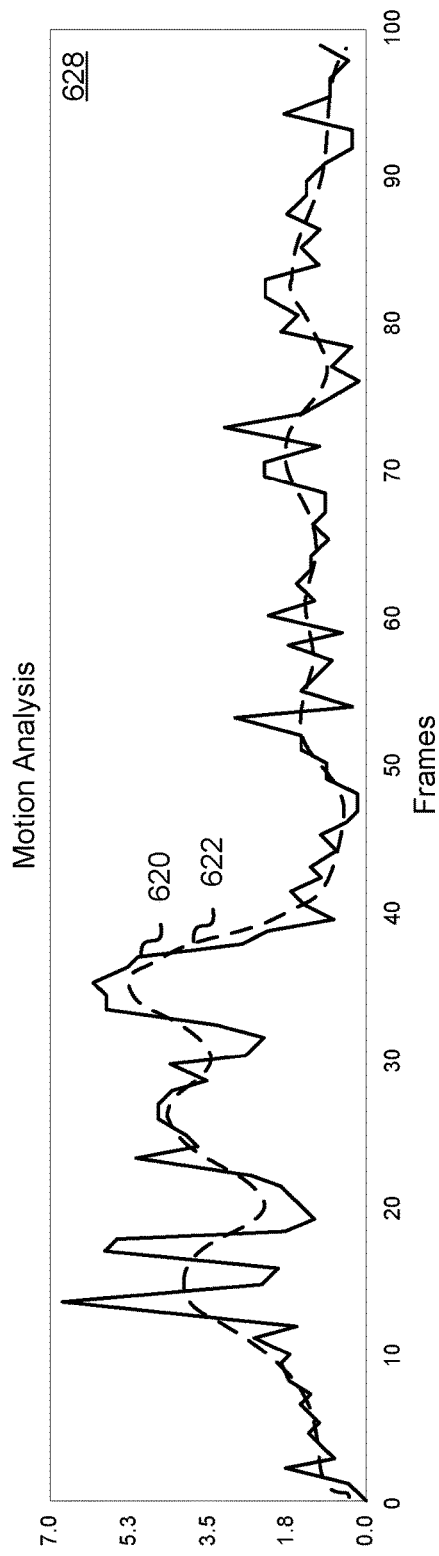
FIG. 6 illustrates an example of normalizing temporal jitter in accordance with an embodiment.

FIG. 6 illustrates an example 600 of normalizing temporal jitter in an embodiment of the present disclosure. Specifically, FIG. 6 depicts a graph 328 illustrating motion values 320 before temporal jitter has been reduced, and normalized motion value 322 after reduction of temporal jitter. In an embodiment, the graph 328 is a graph depicting the temporal jitter captured during the image capture event. For example, the second graph 328B may be a graph depicting the differences between pixels of image pairs before and after temporal jitter has been reduced.

In embodiments, temporal jitter refers to a possible over-emphasis or under-emphasis of motion represented in a difference image due to a variation from average of the capture time between the image pair from which the difference image was derived. For example, a longer time than average between captures may allow for more movement to occur between capture times, resulting in an overemphasized motion value. Conversely, a shorter than average capture time provides less time for motion to be capture, which can result in an under-represented motion value. Thus, the temporal jitter may be normalized by weighting the motion value by the variance of the capture time between capture of the image pair from a target frame rate $$\left(\text{e.g., motion value} \times \frac{\text{target frame rate}}{\text{actual frame rate}}\right).$$

In some embodiments, the target frame rate is the frame rate of the image capture device. In some embodiments, the target frame rate is an average frame rate of the sequence of images. In other embodiments, the target frame rate is a frame rate specified by a user via an interface.

In an embodiment, the normalized motion values 322 may reflect the motion values 320 after temporal jitter has been reduced/normalized in a manner described in the present disclosure. For example, as can be seen, the motion values 320 between frames 10 and 20 appears to spike up and down rapidly. However, after reduction of the temporal jitter, the normalized motion values 322 shows that there was a steadier level of activity during this time period, indicating that much of the upward spikes in the motion values 320 may have been attributed to a longer duration between frames, whereas the downward spikes in the motion values 320 may have been attributed to a shorter duration between frames. However, once the motion values 320 is multiplied (or divided) by a temporal correction factor, the motion reflected by the normalized motion values 322 may be more accurate relative to the actual motion of objects recorded during the image capture event.

Figure 7:
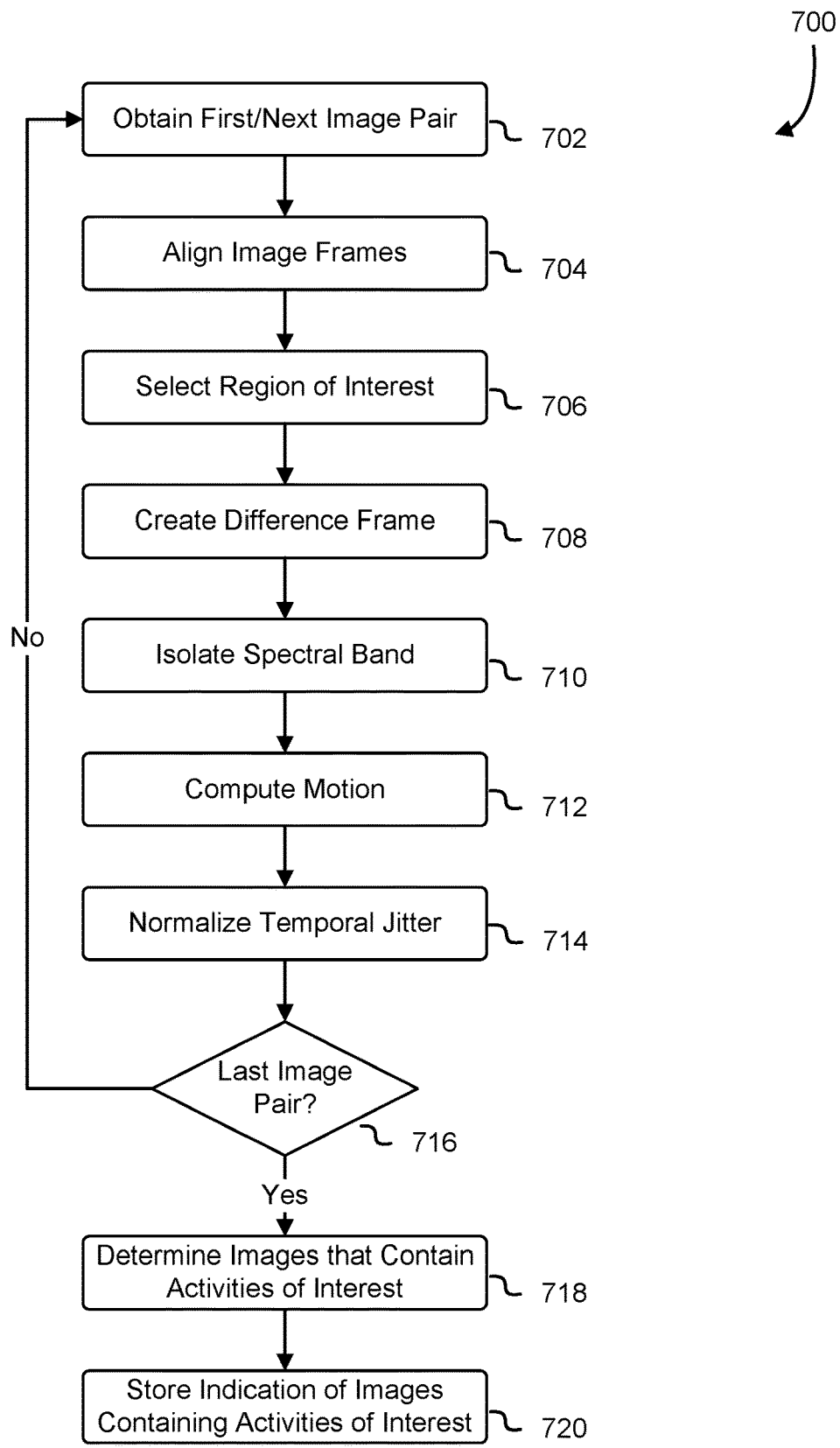
FIG. 7 is a flowchart that illustrates an example of detecting activity of interest in accordance with an embodiment.

FIG. 7 is a flowchart illustrating an example of a process 700 for detecting activity of interest in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. In an embodiment, the executable instructions and/or other data may be stored on a non-transitory computer-readable storage medium (e.g., a computer program persistently stored on magnetic, optical, or flash media).

Figure 8:
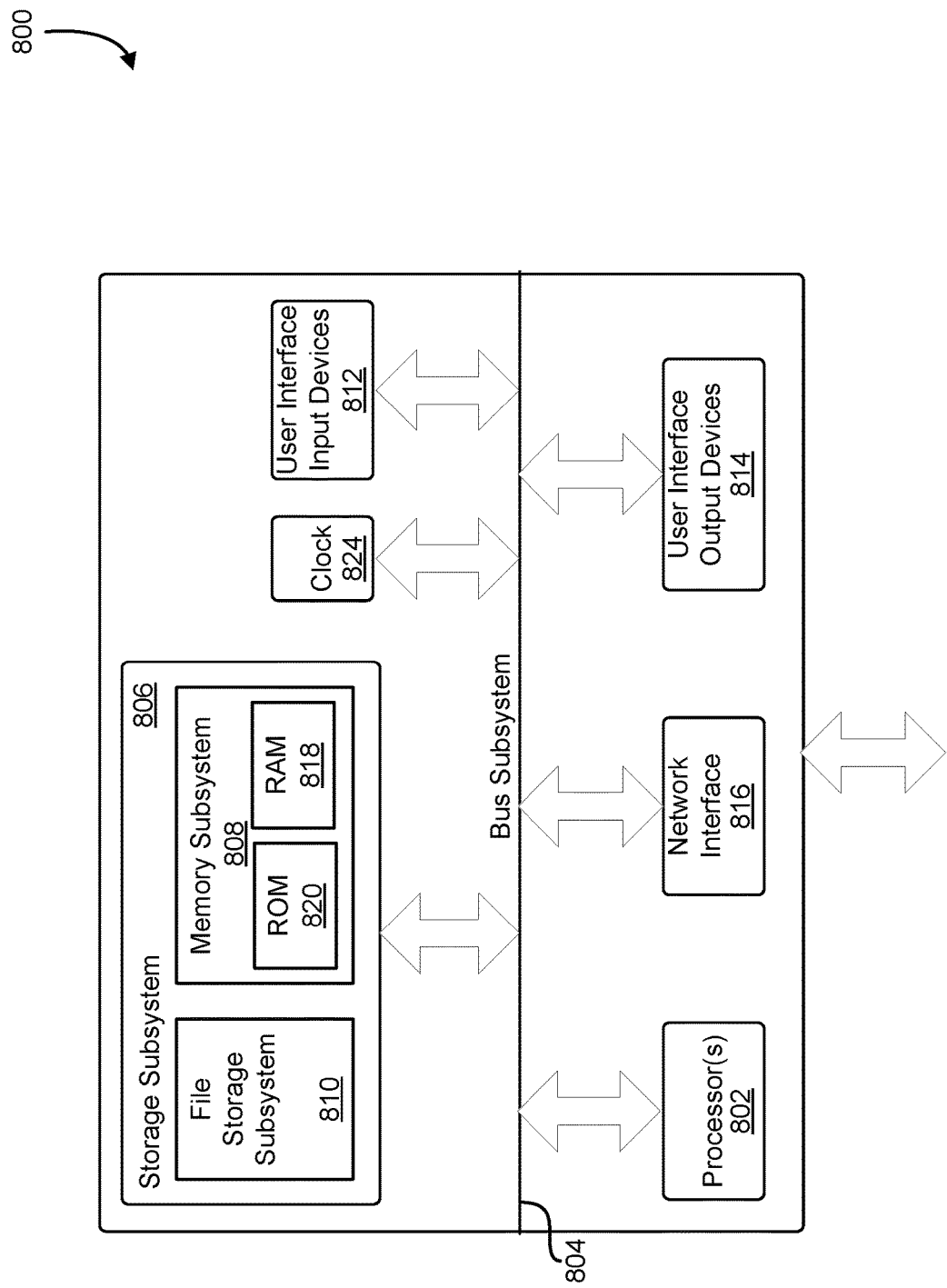
FIG. 8 illustrates an environment in which various embodiments can be implemented.

For example, some or all of process 700 may be performed by any suitable system, such as the computing device 800 of FIG. 8, by multiple of such computing devices in a distributed system of a computing resource service provider, or by any virtual instantiation of such a computing device. The process 700 includes a series of operations wherein images are aligned, regions of interest are selected, a difference image is generated, spectral transformation is performed, a motion value is computed, temporal jitter is normalized, and a determination is made whether the images contain the activity of interest. In embodiments, the process 700 is performed for every pair of adjacent images in a sequence of images corresponding to a video capture event.

In 702, the system performing the process 700 obtains an image pair of a sequence of images. In embodiments, the image pair is two adjacent images in the sequence of images. The image pair, as described above, may depict a scene recorded by an image capture device, where the scene activity of interest by objects of interest. That is, the scene may include digital representations of animate objects (e.g., humans, animals, insects, vehicles, single cell organisms, etc.) and the process 700 may be executed to determine whether the animate objects are performing an activity that involves an amount of motion above a threshold value.

In 704, the system performing the process 700 aligns the image pair with each other. By aligning the image pair, the system is able to neutralize some of the spatial jitter caused by physical movement of the image capture device between capture of the image pair. Neutralizing spatial jitter provides for more accurate determination of motion. However, the operations of 704 may not be performed in every embodiment of the present disclosure.

In 706, the system performing the process 700 determines a common region depicted in each of the images of the image pair. For example, if, due to spatial jitter, the image capture device moved slightly upward into the left the images of the image pair may be offset from each other by a certain number of pixels. By aligning the images in 704, the outer edges of some of the images may be cropped so that the pixels being analyzed in the image pairs are only pixels with counterparts in the images. Similar to the operations of 704, the operations of 706 may not necessarily be performed in all embodiments, however performing the operations of 706 may improve the accuracy of motion calculation by minimizing the contribution of pixels that are not shared between the image frames to the motion value. Note too that the operations of 704-06 may be performed in series with the rest of the operations of the process 700, or may be performed on the entire sequence of images prior to performing the operations of 710-20 each image pair and sequence of images.

In 708, the system performing the process 700 may determine one or more dominant hues and/or one or more ranges of hues in the image pair to deemphasize. In some embodiments, the one or more dominant hues and/or one or more ranges of hues may be determined prior to capturing the sequence of images. For example, if the sequence of images relate to a sports event, an image may be captured of the sports field prior to the sports event, and the one or more dominant hues and/or one or more ranges of dominant hues may be determined based on the prior image capture. In this manner, the one or more dominant hues and/or one or more ranges of hues may be determined without being influenced by hues corresponding to activity of the sports event; in other words, the hues of the uniforms of the players could be excluded from the dominant hue determination. Further in 708, the determined one or more dominant hues and/or one or more range of hues may be deemphasized, such as by reducing (or increasing) a saturation and/or luminosity value of pixels within the one or more ranges of hues or corresponding to the one or more dominant hues. Note that the operations of 708 may be optional, depending on the embodiment, but that performance of the operations of 708 may improve the efficiency of operations 712-20 because the impact of objects, background, and other pixels not of interest on processing the image pair may be reduced. Note also that, in some embodiments, the order of performance of the operations of 708 and 710 may be reversed such that the de-emphasis of dominant hues may be performed to the difference image.

In 710, the system performing the process 700 generates a difference image based on differences between the image pair. For example, the absolute difference between each pixel in a first image of the image pair and its corresponding pixel in a second image of the image pair may be determined to produce the difference image. Thus, a pixel that does not change in value between the first image and the second image has a difference of zero, and may be rendered as black. Whereas a pixel whose hue changes greatly between the first image and the second image, which may be indicative of an object in motion, may have a large difference and consequently may be rendered brightly. In this manner, the difference image may emphasize representations of objects in motion and deemphasize areas in the image pair where little motion is occurring.

In some embodiments, also in 710 the system performing the process 700 further performs spatial transformation of the difference image as described in relation to FIG. 5. For example, the system may create a spatially transformed image by subtracting a low frequency (smoothed/blurred) image from an un-smooth image in one or more iterations to emphasize high-frequency objects in the transformed. This process may be performed a number of iterations sufficient to emphasize the objects of interest while deemphasizing lower frequency objects in the transformed image. Additionally or alternatively, in some embodiments the system performs spatial transformation to the image pair in conjunction with the spectral transformation in 708.

In 712, the system performing the process 700 computes a motion value from the (transformed or untransformed, depending on the particular embodiment) difference image. In some embodiments, the motion value may be derived from us some of one or more components of pixels in the difference image. In this manner, pixels that have been spectrally transformed may have lower pixel component values and consequently contribute less to the motion value. Conversely, pixels that have been emphasized (e.g., representations of objects of interest), having higher pixel component values than the deemphasize pixels, contribute more to the motion value. For example, a motion value generated from the first difference image 118A of FIG. 1 is likely to be greater than a motion value generated from the second difference image 118B since the pixels of the first difference image 118A includes the differences between the first image 102A and the second image 102B due to motion, whereas the pixel values of the second difference image 118B are generally low due to the lack of motion captured between the second image 102B and the third image 102C.

In 714, the system performing the process 700 weights the motion value produced in 712 to normalize any temporal jitter. As described in the present disclosure, in a sequence of image frames, time between captures of image frames may vary to some degree. As a result, a target frame rate may be specified (which may be the frame rate specified for the image capture device) and the motion value may be modified based on whether the time between the capture of the image pair from which the difference image was derived is more or less than the target frame rate. For example, if the time between capture of the image pair was 5% longer than the target frame rate, the motion value may be reduced by 5% to reduce the impact of additional motion that may have been captured in the extra 5% of time. Similarly, if the time between capture of the image pair was 5% less than the target frame rate, the motion value may be increased by 5% in order to compensate for the 5% reduction in time to capture motion between the image frames. In this manner, the motion values of derived from the image pairs may be normalized to compensate for temporal jitter.

In 716, the system performing the process 700 determines whether there are further image pairs in the sequence of images to be processed. If so, the system returns to 702 to obtain the next image pair. For example, if the previous image pair was a first image and a second image, the next image pair may be the second image and a third image. The last image pair may comprise the last image of the sequence of images and the next to last image of the sequence of images. Thus, if the system has processed all of the adjacent image pairs in the sequence of images, the system may proceed to 718.

In 718, the system performing the process 700 determines, based on the motion value computed in 712 and/or normalized in 714. For example, motion values that reach a value relative to a threshold (e.g., reaches a threshold, exceeds a threshold, etc.) may indicate that activity of interest is occurring in the associated images with the motion values. Conversely, motion values that do not reach the value relative to the threshold may be determined not to be associated with the activity of interest.

In some embodiments, the system performing the process 700 passes the set of motion values computed in 702-16 through a low pass filter. The low pass filter may serve the purpose of filtering out haphazard peaks of motion that may skew the identification of activity of interest. For example, a subset of motion values that spike far above the threshold, but only for a short amount of time (e.g., less than 2 seconds) may be due to a video glitch or other error. Such spikes could potentially affect the calculation of the mean/average motion values of the sequence of images for determination of the thresholds, as described below. Thus, the low pass filter may improve the accuracy of the determination of activity of interest in the sequence of images.

In some embodiments, the thresholds may be dynamically determined based on the motion values for the sequence of images, such as based on the mean of the motion values and a certain number of standard deviations from the mean of the motion values. For example, the system may to a user via an interface to select from a list of options for thresholds for determining whether the activity of interest is occurring. For example, a first threshold (high threshold) may be:

$$\text{Mean} + \frac{StdDev}{2}$$

A second threshold (medium threshold) may be simply the Mean, and a third threshold (low threshold) may be:

$$\text{Mean} - \frac{StdDev}{2}$$

Thus, a user may define the amount of motion that reflects an activity of interest by his or her selection. In some embodiments, there may be multiple thresholds. For example, in an embodiment with two thresholds, a motion value at or above a first threshold may indicate that the amount of activity in the recorded scene is high. For example, if the sequence of images are recording of a sporting event images corresponding to motion values that are above the first threshold may be capturing an active moment during the sporting event (e.g., a play from scrimmage in an American football game) that corresponds to activity of interest.

Conversely, a motion value below a second threshold may indicate that the amount of activity in the recorded scene is low, and thus lacks activity of interest. A motion value between the first threshold and the second threshold may be indicative of a moderate amount of activity relative to the overall activity of the sequence, which may be indeterminate whether the associated images correspond to an activity of interest or not.

Various operations may be implemented as a result of the motion value reaching a value relative to a threshold. For example, during playback of the sequence of images, a control through a user interface may allow the user to skip to at the beginning or end of an activity or of interest. In this manner, a viewer may skip the portions of the sequence of images having low activity, may skip to the end of an activity of interest, or may skip back to replay an activity of interest based on the threshold. For example, in a three-hour video of an American football game, a viewer may wish to skip parts of the game during timeouts, portions of the game where the players are just milling about, and only view the active plays of the game. In such a case, selecting (e.g., via interaction with a user interface) to skip to the beginning of the activity of interest may cause playback to jump to the next image associated with motion value above the threshold. Similarly, the user may wish to replay the football play and may select to skip back to the beginning of the activity of interest via the user interface. Thus, the threshold may be used to determine which portions of the sequence of image frames having the activity of interest (e.g., players running around the field). As still another example, the image frames having low activity (e.g., sequential images having motion values below a low threshold) could be clipped out of the sequence of image frames.

In 720, the system performing the process 700 stores values indicating the images in the sequence of images corresponding to one or more levels of the activity of interest. For example, the system may store (e.g., in a database table, in a computer file on a computer readable medium, etc.) values indicating which images of the sequence of images contain the activity of interest. As another example, the system may store, in association with images of the sequence of images, values indicating an amount of activity (e.g., low, medium, high) based on respective motion values relative to the one or more thresholds.

In some embodiments, rather than storing an indication for every image meeting or exceeding a threshold, the system stores indications of images at the beginning and end of an activity of interest. For example, if a motion value associated with an image pair comprising a first image and a second image is below a threshold, whereas a motion value associated with a next image pair (comprising the second image and a third image) is above the threshold, it may indicate the beginning of an activity of interest and a value may be stored (e.g., such as in a data store) indicating that the image common to both image pairs (the second image) marks the beginning of the activity of interest. As another example, if a motion value associated with the image pair is above the threshold while the motion value associated with the next image pair is below the threshold, it may indicate the end of the activity of interest and a value may be stored indicating that the image common to both image pairs (the second image) marks the end of the activity of interest.

Note that one or more of the operations performed in 702-20 may be performed in various orders and combinations, including in parallel. For example, the operations of 710 may be performed between 704 and 706. Note too, as described above, one or more of the operations performed in 702-20 may not be present in every embodiment. For example, some embodiments may lack the operations of 710 and/or 714.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 8 is an illustrative, simplified block diagram of a computing device 800 that can be used to practice at least one embodiment of the present disclosure. In various embodiments, the computing device 800 may be used to implement any of the systems illustrated and described above. For example, the computing device 800 may be configured for use as a data server, a web server, a portable computing device, a personal computer, or any electronic computing device.

As shown in FIG. 8, the computing device 800 may include one or more processors 802 that, in embodiments, communicate with and are operatively coupled to a number of peripheral subsystems via a bus subsystem. In some embodiments, these peripheral subsystems include a storage subsystem 806, comprising a memory subsystem 808 and a file/disk storage subsystem 810, one or more user interface input devices 812, one or more user interface output devices 814, and a network interface subsystem 816. Such a storage subsystem 806 may be used for temporary or long-term storage of information.

In some embodiments, the bus subsystem 804 may provide a mechanism for enabling the various components and subsystems of device 800 to communicate with each other as intended. Although the bus subsystem 804 is shown schematically as a single bus, alternative embodiments of the bus subsystem utilize multiple buses. In an embodiment, the network interface subsystem 816 may provide an interface to other computing devices and networks. In an embodiment, the network interface subsystem 816 may serve as an interface for receiving data from and transmitting data to other systems from the computing device 800. In some embodiments, the bus subsystem 804 is utilized for communicating data such as details, search terms, and so on.

In some embodiments, the user interface input devices 812 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. In an embodiment, the one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. In an embodiment, the applications (programs, code modules, instructions), when executed by one or more processors in some embodiments, provide the functionality of one or more embodiments of the present disclosure and, in embodiments, are stored in the storage subsystem 806. In an embodiment, these application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. In an embodiment, the at least one local clock 824, in some embodiments, is a counter that represents the number of ticks that have transpired from a particular starting date and, in some embodiments, is located integrally within the computing device 800. In various embodiments, the at least one local clock 824 is used to synchronize data transfers in the processors for the computing device 800 and the subsystems included therein at specific clock pulses and can be used to coordinate synchronous operations between the computing device 800 and other systems in a data center. In another embodiment, the local clock is a programmable interval timer.

In an embodiment, the computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    obtaining a sequence of images captured by an image capture device, the sequence of images including a first image frame and a second image frame;
    aligning, based at least in part on a static feature common to the first image frame and the second image frame, the first image frame and the second image frame;
    selecting a region of interest common to both the first image frame and the second image frame;
    generating a difference image based at least in part on the first image frame, the second image frame, and the region of interest;
    computing a first motion value based at least in part on a sum of pixel values in the difference image;
    determining, based at least in part on one but not both of the first motion value and a second motion value having reached a value relative to a threshold, whether an activity of interest is associated with the first motion value, wherein the threshold is based at least in part on a standard deviation from a mean of motion values of the sequence of images; and
    storing, in association with the sequence of images, an indication of whether the activity of interest is associated with the first motion value.

2. The computer-implemented method of claim 1, wherein generating the difference image includes:

transforming, based at least in part on a dominant hue identified in the sequence of images in the region of interest, the first image frame and the second image frame to produce a first transformed image frame and a second transformed image frame; and generating the difference image based at least in part on a difference between the first transformed image frame and the second transformed image frame.

3. The computer-implemented method of claim 1, wherein:

computing the first motion value further includes normalizing, based at least in part on a target frame rate associated with the sequence of images, the sum of pixel values to produce the first motion value; and computing the second motion value further includes normalizing, based at least in part on the target frame rate, another sum of pixel values to produce the second motion value.

4. The computer-implemented method of claim 1, wherein:

the computer-implemented method further comprises computing, further based at least in part on the sequence of images, the second motion value; and storing the indication of whether the activity of interest is associated with the first motion value includes storing, in association with the sequence of images, an indication of whether the activity of interest has started or stopped based at least in part on the determining that one but not both of the motion value and the second motion value have reached the value relative to the threshold.

5. A system, comprising:

one or more processors; and memory including executable instructions that, if executed by the one or more processors, cause the system to:

align a first image with a second image;

compute a first motion value based at least in part on a sum of differences between corresponding pixels in the first image and the second image by at least causing the system to:

modify at least one hue of the first image and the second image;

generate, based at least in part on the first image and the second image, a difference image; and compute the sum of differences from a sum of pixel values of the difference image;

compute, further based at least in part on a third image, a second motion value;

generate, based at least in part on a difference between values derived from the first motion value and the second motion value, an impact score; and perform an action depending at least in part on whether the impact score indicates that damage has occurred among objects represented in the first image and the second image.

6. The system of claim 5, wherein the executable instructions further include instructions that cause the system to store, in association with the first image or the second image, an indication whether an activity of interest has started or stopped based at least in part on a determination that one, but not both, of the first motion value and the second motion value have reached a value relative to a threshold.

7. The system of claim 5, wherein:

the executable instructions further cause the system to:

normalize, based at least in part on a target frame rate and on a time between capture of the first and second image, the first motion value to produce a first normalized value; and normalize, based at least in part on the target frame rate and on a time between capture of the second image and the third image, the first motion value to produce a second normalized value; and the difference derived from the first motion value and the second motion value is a difference the first normalized value and the second normalized value.

8. The system of claim 5, wherein the first image and the second image are adjacent images in a sequence of images.

9. The system of claim 5, wherein the executable instructions further include instructions that cause the system to store, in association with the first image or the second image, an indication whether an activity of interest is occurring based at least in part on whether the first motion value has reached a value relative to a threshold.

10. The system of claim 9, wherein the threshold is derived based at least in part on a mean of motion values of a sequence of images of which the first image and the second image are members.

11. The system of claim 10, wherein the executable instructions further cause the system to apply a low pass filter to the motion values of the sequence of images.

12. The system of claim 5, wherein the at least one hue includes a range of dominant hues in a sequence of images that includes the first image and the second image.

13. A non-transitory computer-readable storage medium having stored thereon executable instructions that, if executed by one or more processors of a computer system, cause the computer system to at least:

align a first image with a second image;

generate, based at least in part on the first image and the second image, a difference image;

compute a motion value based at least in part on a sum of pixel values in the difference image;

modify the motion value based at least in part on a target frame rate to produce a modified motion value;

make a determination, based at least in part on whether the modified motion value reaches a value relative to a threshold, whether an activity of interest occurred between capture of the first image and the second image; and store an indication of the determination.

14. The non-transitory computer-readable storage medium of claim 13, wherein:

the executable instructions further include instructions that cause the computer system to compute, further based at least in part on a third image, another motion value; and the executable instructions that cause the computer system to as a result of a difference between the motion value and the other motion value being greater than a threshold, perform an action.

15. The non-transitory computer-readable storage medium of claim 13, wherein the executable instructions further cause the computer system to apply a low pass filter to the motion value.

16. The non-transitory computer-readable storage medium of claim 13, wherein:

the executable instructions further cause the computer system to transform, based at least in part on a dominant hue, the first image and the second image to produce a first transformed image and a second transformed image; and the executable instructions that cause the computer system to generate the difference image include instructions that cause the computer system to generate the difference image based at least in part on the first transformed image and the second transformed image.

17. The non-transitory computer-readable storage medium of claim 13, wherein the threshold is based at least in part on a standard deviation from a mean of motion values of a set of images, the first image and the second image being members of the set of images.

18. The non-transitory computer-readable storage medium of claim 13, wherein:
the motion value is a first motion value;
the executable instructions further include instructions that cause the computer system to compute, further based at least in part on a third image, a second motion value; and
the executable instructions that store the indication include cause the computer system to store, as the indication, whether an activity has started or stopped based at least in part on the determination, the determination being that:

one of the first motion value or the second motion value exceeds a threshold; and
the other of the first motion value or the second motion value does not exceed the threshold.

19. The non-transitory computer-readable storage medium of claim 18, wherein the executable instructions that cause the computer system to compute the second motion value include instructions that cause the computer system to:
generate another difference image based at least in part on the second image and the third image; and
compute the second motion value based at least in part on another sum of pixel values in the other difference image.

20. The non-transitory computer-readable storage medium of claim 13, wherein the modified motion value reaching the value relative to the threshold indicates a sudden acceleration or deceleration of activity by objects in the first image and the second image.

* * * * *